United States Patent
Sanchez Garcia et al.

(10) Patent No.: US 9,150,739 B2
(45) Date of Patent: Oct. 6, 2015

(54) OXIDIZED CARBON BLACKS TREATED WITH POLYETHERAMINES AND COATING COMPOSITIONS COMPRISING SAME

(71) Applicant: Cabot Corporation, Boston, MA (US)

(72) Inventors: Angelica Maria Sanchez Garcia, Birmingham, MI (US); Eugene N. Step, Newton, MA (US); Jeffrey Scott Sawrey, Westford, MA (US); Lang H. Nguyen, Lowell, MA (US); Joshua B. Preneta, Billerica, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 14/387,293

(22) PCT Filed: Mar. 14, 2013

(86) PCT No.: PCT/US2013/031290
§ 371 (c)(1),
(2) Date: Sep. 23, 2014

(87) PCT Pub. No.: WO2013/148242
PCT Pub. Date: Oct. 3, 2013

(65) Prior Publication Data
US 2015/0087764 A1    Mar. 26, 2015

Related U.S. Application Data

(60) Provisional application No. 61/616,451, filed on Mar. 28, 2012.

(51) Int. Cl.
| | | |
|---|---|---|
| C09C 1/56 | (2006.01) | |
| C08K 9/10 | (2006.01) | |
| C09D 7/12 | (2006.01) | |
| B82Y 30/00 | (2011.01) | |
| B05D 1/02 | (2006.01) | |

(52) U.S. Cl.
CPC ............... *C09D 7/1225* (2013.01); *B05D 1/02* (2013.01); *B82Y 30/00* (2013.01); *C08K 9/10* (2013.01); *C09C 1/56* (2013.01); *C09C 1/565* (2013.01); *C09D 7/1266* (2013.01); *C01P 2004/64* (2013.01); *C01P 2006/12* (2013.01); *C01P 2006/19* (2013.01); *C01P 2006/62* (2013.01); *C01P 2006/63* (2013.01); *C01P 2006/64* (2013.01)

(58) Field of Classification Search
CPC ........... C09C 1/56; C08K 9/10; C09D 7/1225
See application file for complete search history.

(56) References Cited

U.S. PATENT DOCUMENTS

| | | | |
|---|---|---|---|
| 5,200,164 A | | 4/1993 | Medalia et al. |
| 5,272,201 A | * | 12/1993 | Ma et al. ................. 524/505 |
| 6,402,825 B1 | * | 6/2002 | Sun ....................... 106/473 |
| 6,645,287 B2 | | 11/2003 | Nguyen et al. |
| 7,495,042 B2 | | 2/2009 | Nguyen |
| 7,897,658 B2 | | 3/2011 | Nguyen |
| 8,110,257 B2 | * | 2/2012 | Nagashima et al. ....... 428/32.19 |
| 2003/0024434 A1 | | 2/2003 | Butler et al. |
| 2010/0323289 A1 | | 12/2010 | Carroll et al. |
| 2012/0092598 A1 | * | 4/2012 | Kyrlidis et al. ........... 349/106 |
| 2012/0292794 A1 | * | 11/2012 | Prabhu et al. .............. 264/6 |

FOREIGN PATENT DOCUMENTS

EP    1666543 B1    11/2012

OTHER PUBLICATIONS

Cao, et al., "To Improve the Dispersibility of Carbon Black in Water with Plasma and Organic Amines Treatments", Database CA [Online] Chemical Abstracts Service, Columbus, OH, pp. 1-2, XP-002698176.
International Preliminary Report on Patentability of International Application No. PCT/US2013/031290, mailed Oct. 9, 2014.

* cited by examiner

*Primary Examiner* — Vickey Nerangis

(57) ABSTRACT

Disclosed herein are materials and compositions comprising: an oxidized carbon black having a BET surface area ranging from 50 to 700 m2/g, a DBP oil adsorption number ranging from 50 to 200 mL/100 g, and a primary particle size ranging from 7 to 30 nm; and a polyetheramine comprising ethylene oxide and propylene oxide monomers, wherein the polyetheramine coats the oxidized carbon black. Also disclosed are coatings and coating compositions comprising these materials and methods of making the same.

22 Claims, No Drawings

OXIDIZED CARBON BLACKS TREATED WITH POLYETHERAMINES AND COATING COMPOSITIONS COMPRISING SAME

RELATED APPLICATION

This application claims priority under 35 U.S.C. §119(e) to U.S. Prov. App. 61/616,451, filed Mar. 28, 2012, the disclosure of which is incorporated herein by reference.

FIELD OF THE INVENTION

Disclosed herein are oxidized carbon blacks treated with polyetheramines and their use in coatings and coating compositions.

BACKGROUND

Carbon black is the most widely used black pigment in both water- and solvent-based formulations for surface coatings, which typically include resins. The color of the coating depends on several factors including carbon black loading, the quality of a carbon black dispersion in the resin matrix, the specific carbon black grade, and primary particle size and aggregate size. Accordingly, there remains a need to improve coating formulations.

SUMMARY

One embodiment provides a pellet or powdered material comprising:

an oxidized carbon black having a BET surface area ranging from 50 to 700 $m^2/g$, a DBP oil adsorption number ranging from 50 to 200 mL/100 g, and a primary particle size ranging from 7 to 30 nm; and a polyetheramine comprising ethylene oxide and propylene oxide monomers, wherein the polyetheramine coats the oxidized carbon black.

Another embodiment provides a pellet or powdered material comprising:

an oxidized carbon black having a BET surface area ranging from 50 to 700 $m^2/g$, a DBP oil adsorption number ranging from 50 to 200 mL/100 g, and a primary particle size ranging from 7 to 30 nm, and a polyetheramine having the formula:

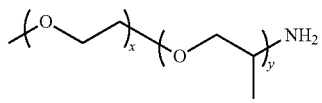

wherein x=1-35, y=3-30, x/y is at least 0.15, and the polyetheramine coats the oxidized carbon black.

Another embodiment provides a coating composition, comprising:

an oxidized carbon black having a BET surface area ranging from 50 to 700 $m^2/g$, a DBP oil adsorption number ranging from 50 to 200 mL/100 g, and a primary particle size ranging from 7 to 30 nm, a polyetheramine comprising ethylene oxide and propylene oxide monomers, and a resin having a molecular weight of at least 10,000.

Another embodiment provides a coating composition, comprising:

an oxidized carbon black having a BET surface area ranging from 50 to 700 $m^2/g$, a DBP oil adsorption number ranging from 50 to 200 mL/100 g, and a primary particle size ranging from 7 to 30 nm, a polyetheramine comprising ethylene oxide and propylene oxide monomers, and;

a resin selected from acrylics, polyesters, polyurethanes, alkyds, cellulose acetate butyrate, nitro cellulose, melamines, epoxies, and blends and copolymers thereof.

Another embodiment provides a coating comprising:

an oxidized carbon black having a BET surface area ranging from 50 to 700 $m^2/g$, a DBP oil adsorption number ranging from 50 to 200 mL/100 g, and a primary particle size ranging from 7 to 30 nm, a polyetheramine comprising ethylene oxide and propylene oxide monomers, and a resin selected from acrylics, polyesters, polyurethanes, alkyds, cellulose acetate butyrate, nitro cellulose, melamines, epoxies, and blends and copolymers thereof.

Another embodiment provides a method of preparing a pellet or powdered material, comprising:

coating an oxidized carbon black with a polyetheramine, wherein the oxidized carbon black is obtained by oxidizing an unmodified carbon black having a BET surface area ranging from 50 to 700 $m^2/g$, a DBP oil adsorption number ranging from 50 to 200 mL/100 g, and a primary particle size ranging from 7 to 30 nm.

Another embodiment provides a method of preparing a coating composition, comprising:

preparing a millbase comprising:
an oxidized carbon black coated with a polyetheramine comprising ethylene oxide and propylene oxide monomers;
a resin having a molecular weight of at least 10,000; and
a dispersion aid.

DETAILED DESCRIPTION

Disclosed herein are compositions directed to oxidized carbon blacks having a polyetheramine coating, coating formulations comprising such oxidized carbon blacks, and methods of making the same.

Black surface coatings are often prepared from formulations containing a dispersion of carbon black and resin. Typically, an optimal dispersion of carbon black in the final dry coating (occurring after solvent evaporation) arises from a coating composition comprising a dispersion of the carbon black in a liquid formulation that is applied to a surface. In solvent-based coatings, the stability of carbon black dispersions in solvent is based on steric stabilization of individual pigment particles. Such stability can be provided by dispersion aids.

More specifically, surface-oxidized carbon black grades, which are typically used in solvent-based coating formulations, often include amine functionalized polymers as dispersion aids because amine groups can anchor with acidic groups on the surface of oxidized carbon black through acid/based interaction. Because dispersion aids are polymeric, they can provide steric stabilization through polymer interaction with the solvent. Thus, typical dispersion aids have a molecular weight of 30,000 to 100,000. The relatively high molecular weight, however, can hinder and/or slow the adsorption of the dispersion aid onto the carbon black surface. This problem can be compounded for carbon blacks having a high surface area and small primary particle size as the number of particle to particle contacts increases, thereby increasing the milling time and the amount of dispersion aid to wet the material and form a good solvent dispersion. Typically, for a high color carbon black dispersion in solvent coating formulations, the typical load of dispersion aid is 50% to 100% by weight of carbon black.

Currently in the solvent-based automotive market for basecoats, the coating formulations balance color (L) and blue undertone (b*) properties of the carbon black, which are typically oxidized carbon blacks. The drawback of using many of these carbon black grades is the long dispersion time to obtain a mill base for full color and good hiding power.

It has been discovered that treating the carbon black with polyetheramines prior to forming the dispersions and mill base compositions is beneficial to the coating formulations and methods of preparing the formulations. Accordingly, one embodiment provides a powdered material comprising:

an oxidized carbon black having a BET surface area ranging from 50 to 700 $m^2/g$, a DBP oil adsorption number ranging from 50 to 200 mL/100 g, and a primary particle size ranging from 7 to 30 nm; and a polyetheramine comprising ethylene oxide and propylene oxide monomers, wherein the polyether amine coats the oxidized carbon black.

In one embodiment, "oxidized carbon blacks" are carbon black pigments generally having a pH<7.0 that feature surface-bound ionic or ionizable groups such as alcohol, phenol, and/or carboxylic acid groups. The extent of oxidation of carbon black can determine the surface concentration of these groups. Exemplary oxidizing agents for carbon blacks include oxygen gas, ozone, peroxides such as hydrogen peroxide, persulfates such as sodium and potassium persulfate, hypohalites such as sodium hypochlorite, nitric acid, and transition metal-containing oxidants such as permanganate salts, osmium tetroxide, chromium oxides, ceric ammonium nitrates, and mixtures thereof (e.g., mixtures of gaseous oxidants such as oxygen and ozone). In one embodiment, the "oxidized carbon blacks" are those pigments having been subjected to an oxidation treatment.

In one embodiment oxidized carbon black is obtained from the oxidation of unmodified carbon blacks, as described above. Unmodified carbon black particles can be selected from channel blacks, furnace blacks, gas blacks, and lamp blacks. Exemplary unmodified carbon blacks include those commercially available as Regal®, Black Pearls®, Elftex®, Monarch®, Mogul®, and Vulcan®, such as Black Pearls® 1100, Black Pearls® 900, Black Pearls® 880, Black Pearls® 800, Black Pearls® 700, Black Pearls® 570, Elftex® 8, Monarch® 900, Monarch® 880, Monarch® 800, Monarch® 700, Regal® 660, and Regal® 330.

In another embodiment, the oxidized carbon black is obtained from commercial sources, such as Black Pearls® 1400, Black Pearls® 1300, Black Pearls® 1000, Black Pearls® L, Monarch® 1000, Mogul® L, and Regal® 400.

In one embodiment, the oxidized carbon black is unmodified. For example, the oxidized carbon black is formed by oxidation of unmodified carbon black. In other embodiments, the oxidized carbon black is further treated with other surface modification methods to introduce ionic or ionizable groups onto a pigment surface, such as chlorination and sulfonylation. In another embodiment, the oxidized carbon black is modified to include attached organic groups. For example, U.S. Pat. No. 5,851,280 discloses methods for the attachment of organic groups onto pigments including, for example, attachment via a diazonium reaction wherein the organic group is part of the diazonium salt. In yet another embodiment, the oxidized carbon black is formed by oxidation of modified carbon black (e.g., modified by chlorination, sulfonylation, or by attachment of organic groups).

In one embodiment, "coat" or "coating" refers to a physical and/or chemical interaction between the polyetheramine and the carbon black that is not covalent. In one embodiment, the polyetheramine and oxidized carbon black interact via adsorption, ionic bonding, van der Waals interaction, etc., and combinations of such interactions. For example, oxidized carbon blacks provide acidic groups (e.g., carboxylic acid or alcohol groups and anions and salts thereof) that can interact with the amine groups (and cations and salts thereof) of the polyetheramine.

In one embodiment, the oxidized carbon black has a BET surface area ranging from 50 to 700 $m^2/g$ (e.g., from 90 to 650 $m^2/g$), a DBP oil adsorption number ranging from 50 to 200 mL/100 g (e.g., from 60 to 160 mL/100 g), and a primary particle size ranging from 7 to 30 nm (e.g., from 10 to 25 nm). BET surface area can be determined according to ASTM-D6556. DBP can be determined according to ASTM-D2414. Primary particle size can be determined according to ASTM-D3849 (07-2011).

In one embodiment, the polyetheramine is a generally a lower molecular weight compound relative to typical dispersion aids. For example, the polyetheramine has a molecular weight ranging from 250 to 5,000, or a molecular weight ranging from 1,000 to 2,500. The polyetheramine can be a mono-, di-, or triamine where the amine groups have sufficient accessibility to interact with the surface of the oxidized carbon black. In one embodiment, the polyetheramine is terminated with one or more amine groups. In one embodiment, the polyetheramine is a monoamine.

In one embodiment, the polyetheramine comprises propylene and ethylene oxide monomers in a ratio ranging from 1:2 to 9:1, such as a ratio ranging from 1:2 to 8:1, 1:2 to 7:1, or 1:2 to 6:1.

The polyetheramine can be branched or linear. In one embodiment, the polyetheramine has the formula:

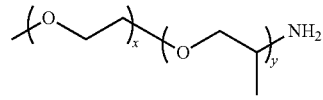

wherein x=1-35, y=3-30, x/y is at least 0.15. In other embodiments, x/y is at least 0.3. For example, x/y can be 9/1, 3/19, 29/6, 10/31, or 1/1. Exemplary polyetheramines can be obtained commercially from Huntsman Corporation under the trademark JEFFAMINE® polyetheramines.

The powdered material is a particulate material and typically comprises aggregates of the primary particles. The powdered material can be present as a dispersion, or as a bulk powder, e.g., a powder substantially free of water or solvent, such as less than 10%, less than 5%, less than 3%, or less than 1% water or solvent. In one embodiment, the polyetheramine is present in the powdered material (e.g., the bulk powdered material) in an amount ranging from 5% to 30% by weight with respect to the total weight of the powdered material, such as an amount ranging from 5% to 30% by weight with respect to the total weight of the powdered material. In another embodiment, the carbon black is present in the powdered material in an amount ranging from 65% to 95% by weight with respect to the total weight of the powdered material.

Another embodiment provides a method of preparing a powdered material, comprising:

coating an oxidized carbon black with a polyetheramine, wherein the oxidized carbon black is obtained by oxidizing a carbon black (e.g., an unmodified carbon black) having a BET surface area ranging from 50 to 700 m²/g, a DBP oil adsorption number ranging from 50 to 200 mL/100 g, and a primary particle size ranging from 7 to 30 nm.

In one embodiment, the step of coating comprises spraying the polyetheramine onto the oxidized carbon black. In one embodiment, the spraying is performed on oxidized carbon black powder.

Many high-color carbon blacks are available as either a powder or pellet, which is the compacted form of the powder. While pellets are easier to handle, e.g., due to reduced dusting, they are more difficult to disperse. It has been discovered that pellets formed by compacting/densifying the powdered materials disclosed herein disperse readily while reducing the amount of dusting during handling. In one embodiment, the pellets have a D50 of at least 100 µm, e.g., a D50 ranging from 100 µm to 5000 µm, from 100 µm to 2000 µm, or from 100 µm to 500 µm, or a D50 of at least 125 µm, e.g., a D50 ranging from 125 µm to 5000 µm, from 125 µm to 2000 µm, or from 125 µm to 500 µm.

One embodiment provides a method of making pellets, comprising compacting unoxidized carbon black to form a compacted material, oxidizing the compacted material, combining the oxidized material with the polyetheramines disclosed herein. In another embodiment, the pellets are prepared by compacting the powdered material disclosed herein. In yet another embodiment, the pellets are prepared by compacting oxidized carbon black and combining the compacted oxidized carbon black with the polyetheramines disclosed herein.

Another embodiment provides compositions for surface coatings, or coating compositions. Accordingly, one embodiment provides a coating composition, comprising:

an oxidized carbon black having a BET surface area ranging from 50 to 700 m²/g, a DBP oil adsorption number ranging from 50 to 200 mL/100 g, and a primary particle size ranging from 7 to 30 nm, a polyetheramine comprising ethylene oxide and propylene oxide monomers, and a resin having a molecular weight of at least 10,000.

In one embodiment, the polyetheramine coats the oxidized carbon black.

The amount of carbon product used in the coating compositions is generally dependent on the desired performance of the resulting coating. For example, the amount of carbon product can be adjusted to optimize such properties as jetness, viscosity, and dispersion stability. In one embodiment, the carbon black is present in the coating composition in an amount ranging from 1% to 30%, such as an amount ranging from 1% to 20% by weight with respect to the total weight of the coating composition.

The coating composition typically comprises a resin having a higher molecular weight than the polyetheramine, e.g., a molecular weight of at least 10,000. The resin can be of a type that promotes a hydrophobic surface and/or any polymer that chemically or physically locks the carbon black particles to each other and/or to a substrate. In one embodiment, the resin is selected from acrylics, polyesters, polyurethanes, alkyds, cellulose acetate butyrate, nitro cellulose, melamines, epoxies, and blends and copolymers thereof.

In one embodiment, where the resin is capable of cross-linking, the coating composition can further comprise cross-linking agents. For example, where the resin is selected from polyols (e.g., polyester polyols, acrylic polyols, and blends and copolymers thereof), the cross-linking agent can be selected from amine-, imine-, and isocyanate-containing compounds, such as Cymel® 325 and Cymel® 303, from Cytec Industries, and Resimene® 717 from INEOS Melamines. The cross-linking agent can be provided in either the mill base or the let down composition. In one embodiment, the resin (optionally including a cross-linking agent) is present in the composition in an amount of at least 40%, at least 50%, or at least 60% by weight with respect to the total weight of the composition.

In one embodiment, the coating composition further comprises a liquid vehicle. In one embodiment, the liquid vehicle comprises a solvent, such as an organic solvent, or a solvent blend. Suitable examples of organic solvents include alcohols (e.g., methanol and isobutanol), glycols, ethers (e.g., tetrahydrofuran or diethylether), ketones (e.g., acetone, methylethyl ketone, or methylbutyl ketone), esters (e.g., n-butyl propionate), acetates (e.g., methyl-, ethyl-, propyl-, and butyl acetate, and propylene glycol methyl ether acetate (PG-MEA)), amides (e.g., dimethylformamide), sulfoxides (e.g., dimethylsulfoxide), hydrocarbons, aromatics (e.g., toluene), halocarbons (e.g., chloroform), and miscible mixtures thereof (e.g., ethylene glycol and methanol). Conventional co-solvents include, but are not limited to, butyl acetate, ethylcellosolve, ethylcellosolve acetate, butylcellosolve, butylcellosolve acetate, ethylcarbitol, ethylcarbitol acetate, diethylene glycol, cyclohexanone, propylene glycol monomethyl ether, propylene glycol monomethyl ether acetate, lactate esters, and mixtures of these may also be employed. In one embodiment, the solvent is present in the coating composition in an amount ranging from 0.1% to 60% by weight, e.g., an amount ranging from 5% to 50% by weight, an amount ranging from 10% to 50% by weight, or an amount ranging from 10% to 40% by weight with respect to the total weight of the composition.

In one embodiment, the coating composition further comprises a dispersing aid. In one embodiment, the dispersing aid is selected from amine-functionalized or amine-terminated compounds such as polyamine, tertiary amine, or quaternary ammonium functionalized compounds, e.g., tetraoctylammonium bromide, block copolymers e.g., those having both a hydrophobic and a hydrophilic group, and polyalkylene oxides or acrylic polymers comprising amine functional groups, and blends and copolymers thereof. Other dispersing aids in addition, or in alternative, to the amine-functionalized compound include, but are not limited to, polyalkylene oxides (such as polyethylene oxide or polypropylene oxide), polyesters (such as polycaprolactone, polyvalerolactone, poly(hydroxy stearic acid), or poly(hydroxyoleic acid), polyamides such as polycaprolactam, polyacrylates, block copolymers having both a hydrophobic and a hydrophilic group, acid functionalized compounds (such as carboxylic acid or phosphonic acid functionalized compounds), polyalkylene oxides or acrylic polymers comprising acid functional groups.

Exemplary dispersants that may be employed include, but are not limited to, the OLOA series (modified polyisobutylene succinimides) from Chevron Chemical Co. Also included but not limited are: BYK108, BYK 115, BYK116, BYK161, BYK163, BYK 182 BYK 2150 and BYK2050, all available from BYK Chemie, Solsperse™ series of dispersants 27000, 32000, 32500, 38500, and 39000, Efkla™ dispersants such as 4050, 4310, and 4061, available from Noveon, including and K-Sperse™ dispersants such as K-Sperse™ 504XD from King Industries.

The amount of dispersing aid can be determined based on one or more factors, including the coated carbon black, the solvent, and the carbon black loading level. In general, the ratio of the amount of dispersing aid to the amount of coated carbon black can be at least about 0.1 or more (e.g., from about 0.2 or more, or from about 0.3 or more, or from about 0.5 or more, or even about from about 1 or more). Alternatively, or in addition, the ratio of the amount of dispersing aid to the amount of coated carbon black can be about 10 or less (e.g., about 5 or less, or about 4 or less, or about 3 or less, or about 2.5 or less). In another embodiment, the ratio of the amount of dispersing aid to the amount of coated carbon black can range from 0.01 to 10, from 0.1 to 5, from 0.1 to 2.5, from 0.5 to 2.5, or from 1 to 2.5.

The dispersions can be prepared by any method known in the art. For example, the coated carbon black and solvent may be combined with agitation to produce a stable dispersion in the presence of a dispersing aid. Alternatively, the dispersing aid can be combined with the pigment, and the resulting combination can then be combined with the solvent. The pigment, dispersing aid, and solvent may be combined in any equipment known in the art, such as ceramic media or ball mill, or other high shear mixing equipment, such as a rotor-stator mixer. Various conventional milling media can also be used. Other methods for forming the dispersion/mill base will be known to one skilled in the art.

The coating composition can be a mill base or any coating composition that is eventually applied to a surface (e.g., after let down). Without wishing to be bound by any theory, the polyetheramine treated carbon black is better wetted by solvent in a mill base in which the polyetheramine molecules can bind to the carbon black surface via an acid/base binding interaction. While the invention is not limited to monoamines, such molecules can adsorb more quickly onto carbon black surfaces and provide initial steric stabilization of carbon black particles in solvent dispersion by virtue of the propylene oxide/ethylene oxide chains. During milling or the formation of dispersions, the larger dispersion aid molecules can be adsorbed on carbon black surface and provide long term stability of mill base and paint formulations. Due to the improved efficiency of dispersing the treated oxidized carbon black, the amount of dispersing aid can be reduced by at least 10% by weight, by at least 20% by weight, or by an amount ranging from 10% to 30% by weight, relative to the amount of dispersing aid used to create a dispersion of untreated oxidized carbon black.

Non-aqueous coating formulations vary widely depending on the final use and the components present, including other additives. Two general classes of additives are fillers and modifiers. Examples of fillers are other coloring pigments, clays, talcs, silicas, and carbonates. Fillers can be added in an amount ranging from 0.1% to 60% by weight, depending on final use requirements. Examples of modifiers are flow and leveling aids generally added at less than 5% by weight (e.g., from 0.1% to 5% by weight). The modified pigments disclosed herein can be incorporated into a non-aqueous coating composition using standard techniques, e.g., as a dispersion.

The coating composition can be prepared in any suitable manner, for example, by combining the treated oxidized carbon black with the liquid vehicle and resin, as well as with other components of the coating composition (e.g., other pigment(s), dispersion aid(s), vehicle(s), other colorant(s) (e.g., dyes), coalescing agent(s), flow additive(s), defoamer (s), surfactant(s), rust inhibitor(s), charge control agent(s), and the like), by any suitable methods, many of which are well known in the art. For example, the modified pigment particles can be added to a mixture of the liquid vehicle and resin in a solvent then dispersed therein using any suitable methods. Alternatively, the modified pigment particles can be added to the liquid vehicle and then dispersed therein, with the carrier or carrier precursor added thereafter. Additional components such as described herein can be added at any suitable stage in the preparation of the coating composition.

Accordingly, another embodiment provides a method of preparing a coating composition, comprising:
 preparing a millbase comprising:
  an oxidized carbon black coated with a polyetheramine comprising ethylene oxide and propylene oxide monomers;
  a resin having a molecular weight of at least 10,000; and
  a dispersion aid.

In one embodiment, the method further comprises the step of combining the millbase with a let down comprising a cross-linking agent. The let down can further comprise a resin, which can be the same or different from the resin in the millbase. In one embodiment, the let down includes at least one resin that is the same as in the millbase. The let down can also comprise additional components such as the cross-linking agent, organic solvents, dispersing aids and surfactants, etc.

Also disclosed herein are coatings, e.g., the composition that results after applying the coating composition to a substrate surface followed by removal of the solvent, e.g., by drying. Accordingly, another embodiment provides a coating composition, comprising:
 an oxidized carbon black having a BET surface area ranging from 50 to 700 $m^2/g$, a DBP oil adsorption number ranging from 50 to 200 mL/100 g, and a primary particle size ranging from 7 to 30 nm,
 a polyetheramine comprising ethylene oxide and propylene oxide monomers, and
 a resin selected from acrylics, polyesters, polyurethanes, alkyds, cellulose acetate butyrate, nitro cellulose, melamines, epoxies, and blends and copolymers thereof.

The resin can be of any resin as disclosed herein. In one embodiment, the resin promotes a hydrophobic surface and/or can chemically or physically lock the carbon black particles to each other and/or to a substrate. In one embodiment, the substrate is selected from glasses, plastics, metals, ceramics, papers, and woods, and painted, coated, or waxed surfaces thereof. In another embodiment, the substrate is selected from metals, such as automotive metal surfaces (such as the automobile body), e.g., steel, aluminum, magnesium, titanium, zinc, and alloys thereof.

The coatings disclosed herein can be used for a variety of different end-use applications, such as, for example, automotive topcoats, to give coatings with improved overall performance properties. The polyetheramine-treated carbon blacks can be readily dispersed in the coating compositions to obtain coatings with improved jetness and blue tone. This will be further clarified by the following examples, which are intended to be purely exemplary of the present invention.

EXAMPLES

Example 1

Various medium color grades carbon blacks have been tested, including Monarch® 880, a base seed carbon black (CB) particle, and Monarch® 1000, which is a nitric acid treated oxidized version of Monarch® 880. Monarch® 1000 carbon black was mixed with M-2005, M-2070 and XTJ-674 grades of JEFFAMINE® polyetheramine and tested in OEM type solvent-based formulations.

Table 1 below lists the combinations of Monarch® 880 and Monarch® 1000 samples with JEFFAMINE® (JA) polyetheramines:

TABLE 1

| Sample # | JA type | CB grade | JA/CB |
| --- | --- | --- | --- |
| 1 | M-2070 | M1000 | 0.05 |
| 2 | M-2070 | M1000 | 0.1 |
| 3 | M-2070 | M1000 | 0.25 |
| 4 | M-2070 | M880 | 0.1 |
| 5 | XTJ-674 | M1000 | 0.05 |
| 6 | XTJ-674 | M1000 | 0.1 |
| 7 | XTJ-674 | M1000 | 0.25 |
| 8 | XTJ-674 | M880 | 0.1 |
| 9 | M-2005 | M1000 | 0.05 |
| 10 | M-2005 | M1000 | 0.1 |
| 11 | M-2005 | M1000 | 0.25 |
| 12 | M-2005 | M880 | 0.1 |

The polyetheramines of sufficient water solubility (JEFFAMINE® polyetheramine M-2070 and XTJ-674) were sprayed in various amounts onto the carbon blacks as aqueous solutions. JEFFAMINE® polyetheramine M-2005 was sprayed as a suspension in water. The carbon black samples were rolled for 10 hours, and then dried overnight at 85° C. The majority of the samples were powders even before oven drying since the amount of added water was minimal (less than DBP). Dry carbon black samples were pulverized before formulating into mill bases.

Example 2

This Example describes the use of the coated carbon black samples of Example 1 in preparing model automotive solvent-based formulations at 2.45% pigment loading with a standard DisperBYK 163 dispersion aid (product of BYK Chemie/Altana).

Mill bases were prepared using the following equipment:
Eiger mill;
1.0 mm Zirconium media;
Blue M Vented Drying Oven (Model POM 206); Gar Lab 15 Hour model (VWR);
air assist spray; and
coarse paint strainers (Paul N. Gardner Co.).
The following raw materials were used:
Setal® 1715VX74 (polyester polyol)
Setalux® 1184SS51 (acrylic polyols)
DisperBYK® 163 (high MW acrylate)
Cymet 325® melamine resin (amino-based cross-linking agent, Cytec)
BYK® 346, wetting agent (silicone surfactant, BYK Chemie)
butyl acetate; and
PGMEA.

A mill base master batch contained the materials listed in Table 2 below:

TABLE 2

| Setal ® 1715VX74 | 60.75 g | 47.65 |
| --- | --- | --- |
| DisperBYK ® 163 | 20 g | 15.69 |
| Butyl Acetate | 23.37 g | 18.33 |
| PGMEA | 23.38 g | 18.34 |
| | 127.5 g | 100.00% |

Setal® 1715VX74 was placed in a quart can and placed in a lab mixer. DisperBYK® 163, butyl acetate and PGMEA were premixed and then added to the Setal® 1715VX74 under good agitation mix for 5 minutes, followed by further mixing for 10 minutes, and then discharged.

The mill base was prepared using in the proportions listed in Table 3, below:

TABLE 3

| Millbase master batch | 127.5 g | 85.0% |
| --- | --- | --- |
| coated carbon black (from Example 1) | 22.5 g | 15.0% |
| 2 mm ceramic media | 150.00 g | 100.00% |

127.5 grams (±0.01) of the millbase master batch was placed in a vessel under high speed dispermat. 22.5 grams of the coated carbon black from Example 1 was added to the millbase master batch under slow agitation. The speed was increased to 4000 RPM and mixed for 5 minutes. The mixture was then recirculated through a horizontal mill (Eiger) for four passes and the viscosity measured. The mixture was discharge and proceeded to the letdown.

Example 3

This Example describes the let down of the mill base composition of Example 2 and preparation of the final coating composition.

A let down master batch was prepared in the proportions listed in Table 4 below:

TABLE 4

| Setalux ® 1184SS51 | 44 g | 18.27 |
| --- | --- | --- |
| Setal ® 1715VX74 | 121 g | 50.25 |
| Cymel ® 325 | 48.8 g | 20.27 |
| BYK ® 346 | 2 g | 0.83 |
| butyl acetate/PGMEA (1/1) | 25 g | 10.38 |
| Total | 240.8 g | 100% |

The Setalux® 1184SS51 and Setal® 1715VX74 were weighed into a half gallon container and placed under the lab mixer. The BYK® 346, butyl acetate, PGMEA, and Cymel® 325 were premixed together then slowly added to the Setalux®/Setal® mixture under good agitation. This master batch was mixed for another 15 minutes then discharged.

A finish was prepared in the proportions listed in Table 5 below

TABLE 5

| Millbase from Example 2 | 9.4 g | 9.4% |
| --- | --- | --- |
| Letdown Master batch | 90.6 g | 90.6% |
| Total | 100.00 g | 100.00% |

90.6 grams (±0.01) of the letdown master batch was added to 9.4 g of the mill base from Example 2 into an 8 oz epoxy coated can under good agitation. This mixture was placed in a skandex for 15 minutes and allowed to stand overnight before application stage.

Example 4

This Example describes the preparation and evaluation of coatings made from the coating compositions of Example 3.

The Formulations with Monarch® 1000 were sprayed on tin plate at 0.8 mil DFT (dry film thickness) and dried at 140° C. for 20 minutes after flash of air drying at room temperature for 10 minutes. The color was measured on Hunter Labscan colorimeter. Table 6 shows the L a b* and $M_c$ data for the samples made from the components of Table 1.

TABLE 6

|    | M1000 | No. 1 | No. 2 | No. 3 | No. 5 | No. 6 | No. 7 | No. 9 | No. 10 | No. 11 |
|----|-------|-------|-------|-------|-------|-------|-------|-------|--------|--------|
| L  | 1.52  | 1.54  | 1.42  | 1.32  | 1.38  | 1.32  | 1.3   | 1.34  | 1.3    | 1.24   |
| a* | 0.02  | 0.01  | 0.02  | 0     | 0.01  | 0.01  | 0     | 0.03  | 0.07   | 0.04   |
| b* | 0.31  | 0.09  | 0.11  | 0.12  | 0.12  | 0.16  | 0.12  | 0.18  | 0.21   | 0.2    |
| Mc | 272   | 275   | 278   | 280   | 279   | 280   | 282   | 279   | 279    | 282    |

From this data, it can be seen that samples of oxidized carbon black treated with polyetheramines show lower L (stronger color), better (lower) color tone b*, and higher Mc values than the control sample of oxidized carbon black without coated polyetheramine. The increase of the amount of polyetheramine on carbon black results in coating with better color development. Polyetheramines with higher content of propylene oxide, which are more hydrophobic, XTJ-674 and M-2005 yielded better color than the more hydrophilic M-2070.

Mill bases made with non-oxidized CB M880 (sample nos. 4, 8 and 12) were too viscous for coating preparation; data could not be collected for these samples.

Example 5

Coating compositions were made with Black Pearls® 1300 grade of oxidized carbon black and coated with JEFFAMINE® polyetheramines, as listed in Table 7 below.

TABLE 7

| Sample # | polyetheramine | carbon black grade | polyetheramine/CB |
|----------|----------------|--------------------|--------------------|
| A | M-2070  | Black Pearls ® 1300 | 0.1  |
| B | M-2070  | Black Pearls ® 1300 | 0.15 |
| C | M-2070  | Black Pearls ® 1300 | 0.2  |
| D | XTJ-674 | Black Pearls ® 1300 | 0.1  |
| E | XTJ-674 | Black Pearls ® 1300 | 0.15 |
| F | XTJ-674 | Black Pearls ® 1300 | 0.2  |
| G | XTJ-674 | Black Pearls ® 1300 | 0.2  |
| H | XTJ-674 | Black Pearls ® 1300 | 0.2  |
| I | XTJ-674 | Black Pearls ® 1300 | 0.2  |
| J | M-2005  | Black Pearls ® 1300 | 0.1  |
| K | M-2005  | Black Pearls ® 1300 | 0.15 |
| L | M-2005  | Black Pearls ® 1300 | 0.2  |

The coating compositions were prepared according to the methods outlined in Examples 1-4. The color performance ($M_e$) of these samples was compared with the performance of compositions containing an oxidized carbon black from Orion (FW200), which is uncoated. The results are shown in Table 8.

TABLE 8

| Sample | Mc  |
|--------|-----|
| FW200  | 284 |
| A      | 277 |
| B      | 286 |
| C      | 287 |
| D      | 288 |
| E      | 289 |
| F      | 291 |
| G      | 292 |
| H      | 290 |
| I      | 289 |
| J      | 288 |
| K      | 289 |
| L      | 292 |

It was found that inventive samples give better color of the coating, with Mc value of 5 to 7 units higher than those made with FW200. Based on these results, it can be concluded that hydrophilic JEFFAMINE® polyetheramine M-2070), does not provide as good jetness as medium and highly hydrophobic materials (similar to results of M1000). JEFFAMINE® polyetheramine XTJ-674 and M-2005 perform equally well.

To achieve good jetness and hiding power, a solvent mill base with Monarch® 1300 (uncoated) needs to pass through a media mill 4 to 5 times. Using the oxidized carbon blacks coated with polyetheramines, as described herein, such as aqueous solutions of pulverized Black Pearls® 1300 pellets mixed with polyetheramine followed by drying, the milling time through a media mill is reduced to 1 pass.

It was also found that mill bases disclosed herein, such as a mill base prepared with Black Pearls® 1300 (samples 1 to 12), required substantially lower amounts of dispersion aid to achieve good color. This behavior brings additional benefit to customers, by lowering total cost of the formulation.

Example 6

This Example describes the formation of polyetheramine-treated pellets.

Oxidized carbon black pellet samples Black Pearls® 1000 and Black Pearls® 1300 were treated with JEFFAMINE® polyetheramine M-2005 in the same manner as Example 1 to produce polyetheramine-treated pellets Sample A and Sample B, respectively.

A representative pellet size distribution for Samples A and B is provided in Table 9.

TABLE 9

| 2000 µm | 1000 µm | 500 µm | 250 µm | 125 µm | 62.5 µm |
|---------|---------|--------|--------|--------|---------|
| 8%      | 13%     | 17%    | 38%    | 18%    | 6%      |

Example 7

This Example describes the preparation of coating compositions from the Sample A and Sample B pellets of Example 6. Table 10 lists the materials for preparing a millbase masterbatch:

TABLE 10

| Raw material | Amount (%) |
|--------------|------------|
| Setal ® 189SS65 (polyester resin) | 30.77 |
| Efka ® 4310 (dispersant) | 8.00 |
| Butyl Acetate | 25.61 |
| PGMEA | 25.62 |
| carbon black (Sample A or Sample B) | 10.00 |

A mixture of Efka 4310, butyl acetate, and PGMEA was prepared followed by the addition of Setal® 189SS65 under good agitation. Carbon black was then added slowly followed by mixing for 5 min. at 4000 rpm. This mixture was then passed through a horizontal media Eiger mill at 10 m/s tip speed for a number of passes, as specified below.

The mill base was reduced with the letdown formulation of Table 11:

TABLE 11

| Raw material | Amount (%) |
| --- | --- |
| Setal ® 189SS65 | 48.11 |
| CAB551-0.01 (30% BA) (cellulose acetate butyrate resin in butyl acetate) | 29.88 |
| Cymel ® 325 | 2.79 |
| BYK ® 346 | 0.45 |
| butyl acetate/PGMEA | 18.77 |

A mixture of cellulose acetate butyrate resin solution, Cymel 325, and BYK346 were blended together in butyl acetate/PGMEA. This mixture was added to the Setal® 189SS65 under good agitation and mixed for 15 min and discharged. A finish formulation was prepared in the proportions listed in Table 12 below.

TABLE 12

| Raw material | Amount (%) |
| --- | --- |
| Masterbatch letdown | 89.5 |
| Millbase | 10.5 |

The millbase was added to the masterbatch letdown under good agitation, mixed for 20 min. and then discharged.

Coatings were formed by casting out the formulation on cold roll steel and BYK chart with a 0.003 cast out bar, followed by air drying for 10 minutes at room temperature, and curing at 150° F. for 10 minutes. The resulting clear coat was cast with a 0.005 cast out bar followed by air drying for 24 hours at room temperature.

Tables 13-18 below show the L, b, and Mc values, respectively for the pellets disclosed herein (Samples A and B) compared to a pelleted, oxidized black (Black Pearls® 1000) and; a powdered oxidized black (Monarch® 1000 or Monarch® 1300).

TABLE 13

| | L values | | |
| --- | --- | --- | --- |
| | BP1000 | M1000 | Sample A |
| Pass 1 | 11.00 | 8.03 | 1.72 |
| Pass 2 | 8.52 | 2.63 | 1.52 |
| Pass 3 | 7.58 | 2.04 | 1.54 |
| Pass 4 | 6.63 | 1.76 | 1.55 |
| Pass 5 | 5.26 | 1.67 | 1.54 |
| Pass 6 | 4.98 | | |
| Pass 7 | 3.93 | | |

TABLE 14

| | L values | |
| --- | --- | --- |
| | Sample B | M1300 |
| Pass 1 | 3.50 | 18.49 |
| Pass 2 | 1.22 | 7.11 |
| Pass 3 | 1.12 | 4.15 |
| Pass 4 | 1.05 | 2.48 |
| Pass 5 | 1.04 | 1.89 |

TABLE 15

| | b values | | |
| --- | --- | --- | --- |
| | BP1000 | M1000 | Sample A |
| Pass 1 | 0.95 | 3.06 | −0.15 |
| Pass 2 | 1.41 | 0.78 | −0.43 |
| Pass 3 | 1.19 | 0.33 | −0.44 |
| Pass 4 | 1.15 | 0.06 | −0.46 |
| Pass 5 | 1.00 | −0.02 | −0.43 |
| Pass 6 | 0.90 | | |
| Pass 7 | 0.82 | | |

TABLE 16

| | b values | |
| --- | --- | --- |
| | Sample B | M1300 |
| Pass 1 | 1.66 | 2.57 |
| Pass 2 | −0.12 | 3.55 |
| Pass 3 | −0.20 | 2.43 |
| Pass 4 | −0.31 | 1.41 |
| Pass 5 | −0.27 | 0.91 |

TABLE 17

| | $M_c$ values | | |
| --- | --- | --- | --- |
| | BP1000 | M1000 | Sample A |
| Pass 1 | 189.00 | 193.00 | 274 |
| Pass 2 | 198.00 | 245.00 | 285 |
| Pass 3 | 203.50 | 260.00 | 285 |
| Pass 4 | 208.50 | 270.00 | 284 |
| Pass 5 | 218.00 | 274.00 | 284 |
| Pass 6 | 221.00 | | |
| Pass 7 | 230.50 | | |

TABLE 18

| | $M_c$ values | |
| --- | --- | --- |
| | Sample B | M1300 |
| Pass 1 | 226 | 165 |
| Pass 2 | 289 | 194 |
| Pass 3 | 295 | 214 |
| Pass 4 | 300 | 237 |
| Pass 5 | 300 | 252 |

The disclosed pellets (Samples A and B) demonstrated superior color performance relative to the oxidized carbon black and the untreated carbon black. Faster color L and b values development can be attributed to greater dispersion of the pigment particle in the system. The same also can be seen with color jetness development. Samples A and B achieved optimum color performance in 2 passes versus 5 passes for commercial oxidize black. The base black cannot approach the color performance of the disclosed pellets even after 7 passes in the mill.

Moreover, Samples A and B required a dispersant loading of just 20%, while both the base and oxidized carbon blacks require loadings of 40% or higher. The low dispersant requirement the disclosed pellets can be attributed to the lower surface energy of the polyetheramine/pellet composite in a nonpolar formulation.

Example 8

This Example describes the treatment of oxidized carbon black with polyetherdiamines and coating compositions prepared therefrom.

A powdered, oxidized black, Monarch® 1300, was treated with JEFFAMINE® polyetheramine grade D-230 in the same manner as described in Example 1 to form the polyetherdiamine-treated carbon black (Sample C). Table 19 below lists the components of the millbase composition.

TABLE 19

| Raw material | Amount (%) | Amount (%) |
|---|---|---|
| Setal® 189SS65 | 34.3 | 34.3 |
| DisperBYK® 161 | 20 | 10 |
| butyl acetate | 35.7 | 45.7 |
| carbon black | 10 | 10 |
|  | M1300 | Sample C |

A mixture of DisperBYK® 161, butyl acetate, and PGMEA was prepared followed by the addition of Setal® 189SS65 under good agitation. The carbon black was slowly to this mixture and then mixed for another 5 minutes at 4,000 RPM.

This mixture was then passed through a horizontal media through Eiger mill at 10 m/s tip speed, discharged, then run for millbase viscosity.

The finish formulation is provided in Table 20 below.

TABLE 20

| Raw material | Amount (%) |
|---|---|
| Setal® 189SS65 | 21.75 |
| CAB381-2 (15% BA) | 16.65 |
| Millbase | 5 |

The Setal® 189SS65 and cellulose acetate butyrate resin solution were combined under good agitation, followed by combining with the millbase and mixing for 15 min. This formulation was discharged and coatings were prepared in the same manner as described in Example 7.

Table 21 lists the L, a, b, and Mc values.

TABLE 21

|  | M1300 | Sample C |
|---|---|---|
| L | 0.99 | 0.84 |
| a | 0.12 | 0.12 |
| b | 0.12 | 0.16 |
| $M_c$ | 292 | 299 |

It can be seen that the polyetherdiamine-treated carbon black achieves improved L and $M_c$ values, compared to the untreated sample.

The Examples demonstrate that coatings prepared with the coated oxidized carbon blacks, according to the claimed invention, exhibited color properties significantly exceeded those prepared with uncoated oxidized carbon blacks.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A powdered material comprising:
    an oxidized carbon black having a BET surface area ranging from 50 to 700 m²/g, a DBP oil adsorption number ranging from 50 to 200 mL/100 g, and a primary particle size ranging from 7 to 30 nm; and
    a polyetheramine wherein said polyetheramine consists of ethylene oxide and propylene oxide monomers and one or more amine groups and wherein the polyetheramine coats the oxidized carbon black.

2. The powdered material of claim 1, wherein the polyetheramine has a molecular weight ranging from 250 to 5,000.

3. The powdered material according to claim 1, wherein the propylene oxide and ethylene oxide monomers are present in the polyetheramine in a ratio ranging from 1:2 to 9:1.

4. The powdered material according to claim 1, wherein the polyetheramine is present in the powdered material in an amount ranging from 5 to 30% by weight.

5. The powdered material according to claim 1, wherein the oxidized carbon black is present in the powdered material in an amount ranging from 65 to 95%.

6. The powdered material according to claim 1, wherein the oxidized carbon black is formed by oxidation of unmodified carbon black.

7. The powdered material according to claim 1, wherein the material is a bulk powdered material.

8. The powdered material of claim 1, wherein:
    the polyetheramine has the formula:

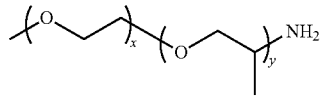

wherein x=1-35, y=3-30, x/y is at least 0.15, and the polyetheramine coats the oxidized carbon black.

9. The powdered material of claim 8, wherein x/y is at least 0.3.

10. A pellet comprising:
    an oxidized carbon black having a BET surface area ranging from 50 to 700 m²/g, a DBP oil adsorption number ranging from 50 to 200 mL/100 g, and a primary particle size ranging from 7 to 30 nm; and
    a polyetheramine wherein said polyetheramine consists of ethylene oxide and propylene oxide monomers and one or more amine groups and wherein the polyetheramine coats the oxidized carbon black.

11. The pellet of claim 10, wherein:
    the polyetheramine has the formula:

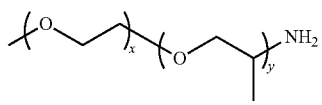

wherein x=1-35, y=3-30, x/y is at least 0.15, and the polyetheramine coats the oxidized carbon black.

12. The pellet of claim 10, wherein the pellet has a D50 of at least 100 μm.

13. A coating composition, comprising:
an oxidized carbon black having a BET surface area ranging from 50 to 700 m²/g, a DBP oil adsorption number ranging from 50 to 200 mL/100 g, and a primary particle size ranging from 7 to 30 nm,
a polyetheramine wherein said polyetheramine consists of ethylene oxide and propylene oxide monomers and one or more amine groups and wherein the polyetheramine coats the oxidized carbon black and
a resin having a molecular weight of at least 10,000.

14. The composition of claim 13, wherein the resin is selected from acrylics, polyesters, polyurethanes, alkyds, cellulose acetate butyrate, nitro cellulose, melamines, epoxies, and blends and copolymers thereof.

15. The composition according to claim 13, wherein the polyetheramine has a molecular weight ranging from 500 to 5,000.

16. The composition according to claim 13, wherein the propylene oxide and ethylene oxide monomers are present in the polyetheramine in a ratio ranging from 1:2 to 9:1.

17. The composition according to claim 13, wherein the resin is present in the composition in an amount of at least 60% by weight.

18. The composition according to claim 13, wherein the oxidized carbon black is present in the composition in an amount ranging from 1% to 30% by weight.

19. A coating comprising:
an oxidized carbon black having a BET surface area ranging from 50 to 700 m²/g, a DBP oil adsorption number ranging from 50 to 200 mL/100 g, and a primary particle size ranging from 7 to 30 nm,
a polyetheramine wherein said polyetheramine consists of ethylene oxide and propylene oxide monomers and one or more amine groups and wherein the polyetheramine coats the oxidized carbon black and
a resin selected from acrylics, polyesters, polyurethanes, alkyds, cellulose acetate butyrate, nitro cellulose, melamines, epoxies, and blends and copolymers thereof.

20. A method of preparing a pellet or powdered material, comprising:
coating an oxidized carbon black with a polyetheramine, wherein the oxidized carbon black is obtained by oxidizing an unmodified carbon black having a BET surface area ranging from 50 to 700 m²/g, a DBP oil adsorption number ranging from 50 to 200 mL/100 g, and a primary particle size ranging from 7 to 30 nm, wherein said polyetheramine consists of ethylene oxide and propylene oxide monomers and one or more amine groups.

21. The method of claim 20, wherein the step of coating comprises spraying the polyetheramine onto the oxidized carbon black.

22. The method of claim 20, wherein the oxidized carbon black is obtained by oxidizing the unmodified carbon black with nitric acid.

* * * * *

UNITED STATES PATENT AND TRADEMARK OFFICE
CERTIFICATE OF CORRECTION

| | | |
|---|---|---|
| PATENT NO. | : 9,150,739 B2 | Page 1 of 1 |
| APPLICATION NO. | : 14/387293 | |
| DATED | : October 6, 2015 | |
| INVENTOR(S) | : Angelica Maria Sanchez Garcia et al. | |

It is certified that error appears in the above-identified patent and that said Letters Patent is hereby corrected as shown below:

In the Specification

At column 1, line 7, that portion of the paragraph reading "This application claims priority under" should read --This application is a 371 National Stage Application based on International Application No. PCT/US2013/031290 filed on March 14, 2013 which claims priority under--

Signed and Sealed this
Nineteenth Day of April, 2016

Michelle K. Lee
*Director of the United States Patent and Trademark Office*